C. C. CHASE.
ENGINE LIFTER.
APPLICATION FILED MAY 26, 1919.
1,401,138.
Patented Dec. 27, 1921.
2 SHEETS—SHEET 2.
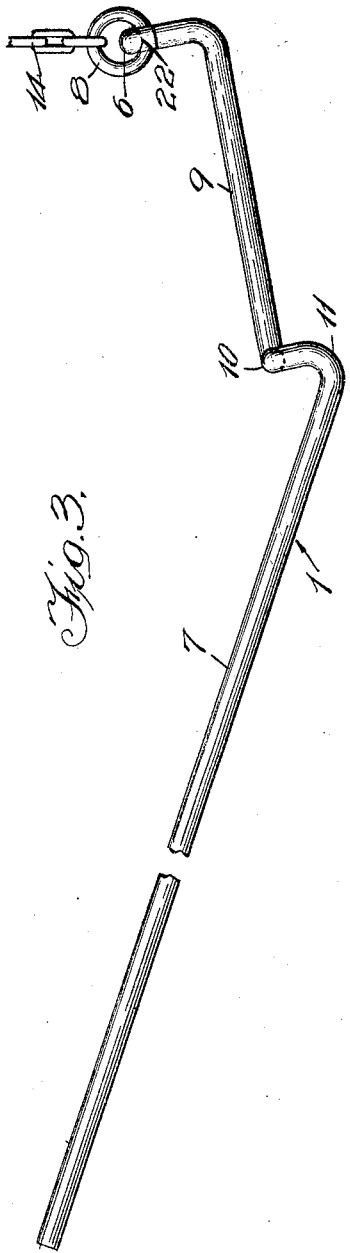
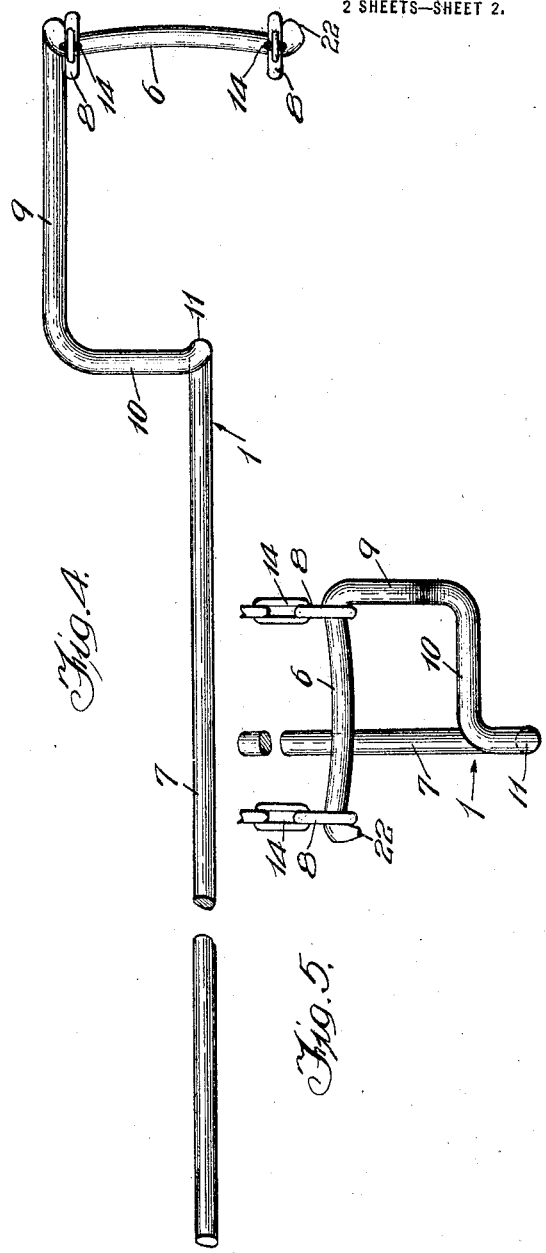
Witnesses
W. F. Kilroy
Harry R. L. White
Inventor:
Clarence C. Chase
By Brown, Boettcher & Sienner
Attys.

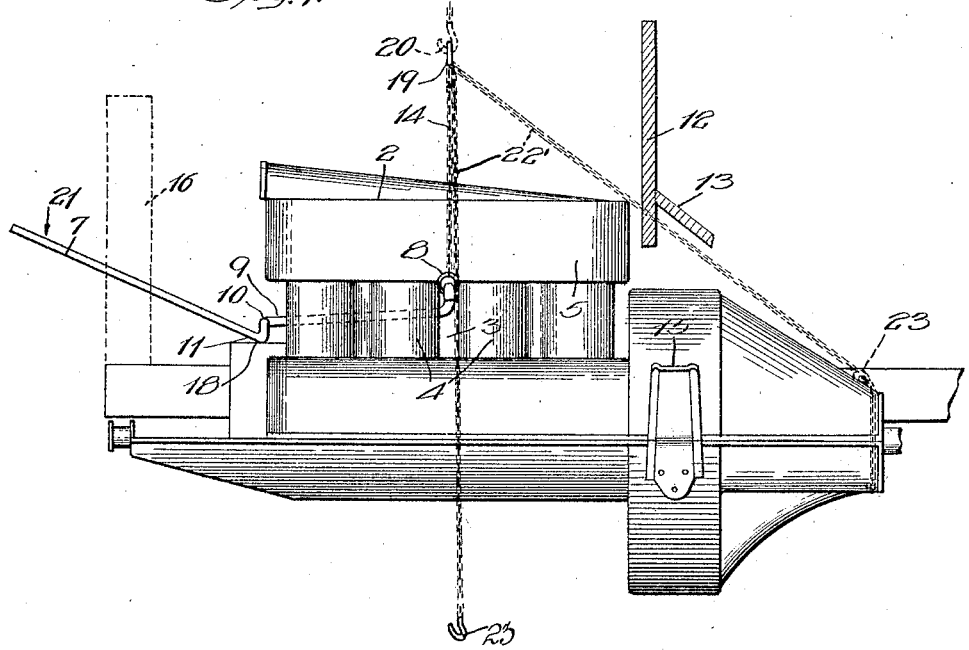
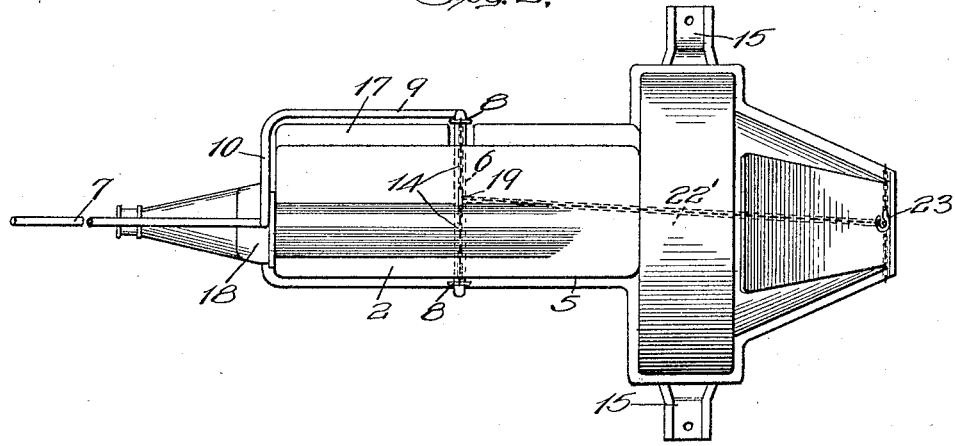

UNITED STATES PATENT OFFICE.

CLARENCE C. CHASE, OF BUDA, ILLINOIS.

ENGINE-LIFTER.

1,401,138.  Specification of Letters Patent.  Patented Dec. 27, 1921.

Application filed May 26, 1919. Serial No. 299,758.

*To all whom it may concern:*

Be it known that I, CLARENCE C. CHASE, a citizen of the United States, residing at Buda, in the county of Bureau and State of Illinois, have invented a certain new and useful Improvement in Engine-Lifters, of which the following is a full, clear, concise, and exact description, reference being had to the accompanying drawings, forming a part of this specification.

My invention relates to an improved tool for assisting in the lifting and controlling of heavy objects such as automobile engines.

My object is to provide a tool for assisting in removing an automobile engine from the automobile for repairs and placing it back in position on the frame, and by the use of which, in combination with a suitable hoist, one man can readily remove and replace an engine.

As commonly constructed the rear part of an automobile engine projects rearwardly beneath the dash and foot board and when it is desired to remove the engine it must first be worked forward to free the rear part from the dash before it can be raised free of the automobile frame. Another difficulty encountered with many engines is that the only point at which the hoist chain can be attached is a point between the cylinders which is some distance forward of the center of gravity, and consequently if it is attempted to lift the engine by a hoist attached at this point, the engine will tip over backward and cannot be readily withdrawn from its position beneath the dash unless the engine is controlled by some means.

By means of my invention I am enabled to attach the hoist at this convenient point, viz; between the cylinders of the engine and I am enabled to control the lifting force as applied to the engine so as to maintain the engine in a substantially level or horizontal position and lift it free of its supports so that it can be worked forward in relation to the automobile frame until it is free of the dash and can then be raised to free it entirely from the automobile frame.

My invention consists in a lever having a part adapted to be projected through the engine between the cylinders and to which the chains of the hoist are adapted to be attached and having a long handle adapted to project out in front of the engine and provided with a heel which is adapted to rest upon the forward end of the engine and by means of which lever I can readily counterbalance the weight of the rear part of the engine, as it hangs upon the hoist chain, by downward pressure upon the free end of the lever. My invention also contemplates the use of a third chain depending from the hook of the hoist and adapted to be attached to the rear end of the engine after the same has been lifted free of the automobile frame to support the rear end of the engine and hold the engine in a level position until such time as it is desired to replace the engine in the automobile.

My invention will be more readily understood by reference to the said accompanying drawings, in which:

Figure 1 is a fragmentary sectional view of an automobile particularly illustrating the application and use of my improved tool;

Fig. 2 is a top plan view of the automobile engine supported by the hoist after removal from the automobile;

Fig. 3 is a side elevation of the tool;

Fig. 4 is a top plan view of the tool; and

Fig. 5 is a fragmentary view illustrating the forward end of the tool to which is secured the chain hoist.

My improved tool 1 is made from a single bar of metal, preferably of circular cross section as shown.

As commonly constructed, automobile engines 2, for lifting of which the tool is especially useful, are each provided with a transverse opening 3 between the middle cylinders 4. This opening extends between the lower part of the cylinders 3 and is closed at its upper end by the water jacket 5.

I bend off the forward end 6 of the tool substantially at right angles to the shank or handle end 7 and I make this bent off portion long enough to extend through the opening 3 in the engine frame, its ends projecting at each side beyond the water jacket 5 as best shown in the plan view, Fig. 2. This right angled end portion or cross bar 6 is curved upwardly toward its ends, as best shown in Fig. 5, so that the rings 8 of the hoist chain will have definite positions at the ends of the cross bar and will be held in these positions by the weight of the engine.

I connect this cross bar end 6 of the tool with the handle end 7 by the longitudinally extending portion 9 and the inwardly bent portion 10. At the junction of the portion 10 and the handle part 7 I form a downwardly curved heel 11, the handle portion 7 extending rearwardly and upwardly on an incline from the heel and being inclined at a suitable angle to the horizontal, as shown in Fig. 1, so that the one using it can readily apply his weight to the handle in counterbalancing the rear part of the engine.

In Fig. 1 I have illustrated the use of the tool in assisting in the removal of the engine 2 from the automobile. The rear part of the engine extends rearwardly beneath the automobile dash 12 and foot board 13 and as the opening 3 is considerably forward of the center of gravity of the engine it is readily seen that if it is attempted to lift the engine directly upwardly by the hoist chains 14 which are attached to the rings 8 the forward part of the engine would rise while the rear part would remain resting on the support brackets 15, consequently the engine would be bound beneath the dash and could not be lifted.

It will be understood, of course, that before beginning to lift the engine the radiator 16 is removed, together with the usual radiator fan and its belt connection and the engine is loosened from its several fastenings and disconnected from the transmission shaft.

In applying my tool I preferably arrange it to be inserted through the opening 3 from the valve side of the engine, making the offset in the tool between the cross bar 6 and the heel 11 of sufficient extent to pass the valve chest 17 of the engine and permit the heel 11 to rest centrally upon a flat bearing surface 18 on the forward part of the engine.

The lifting chains 14 extend upwardly a suitable distance to a ring 19 to which they are both linked and which is adapted to receive the hook 20 of a suitable hoist.

It will now be apparent from Fig. 1 that when a lifting force is applied to the chains 14 which would tend to lift the forward part of the engine in advance of the rear part, this tipping tendency can be readily counterbalanced by a downward pressure on the free end of the handle of the device as indicated by the arrow 21 on Fig. 1 and that the one using the device can readily maintain the engine in a horizontal position.

In removing an engine from an automobile one of the rings 8 of the lifting chains 14 is first strung onto the cross bar 6, then the cross bar is inserted through the opening 3 of the engine and the other lifting chain is attached. The tool is then placed in position on the engine with the heel 11 centrally on the flat bearing surface 18 of the forward part of the engine. The cross bar 6 is provided with a downwardly bent end 22 to prevent the outer ring 8 sliding off in use. After the rings 8 have been placed upon the cross bar 6 as described, the upper ring 19 is placed on the hook 20 of the hoist and a slight lifting strain is produced, enough to begin to lift the engine. Then by a downward pressure on the handle end 7 of the tool the rear end of the engine is lifted free of its supports so that the engine can be easily worked forward in relation to the chassis to free its rear end from the dash 12 and floor 13, at which time the engine can be readily lifted clear of the automobile.

For the purpose of retaining the engine in horizontal position after it is free of the automobile and to relieve the operator from applying weight to the handle of the tool for holding the engine horizontal, I provide a third chain 22' attached to its upper end to the ring 19 and hanging freely therefrom.

While lifting the engine this chain 22' may hang down free from the ring 19. This chain is long enough to reach down and to be carried around the rear part of the engine and is provided on its free end with a hook 23 adapted to engage the chain itself. After the engine is free of the automobile, this third chain can be carried around under the rear part of the engine and brought up and hooked to itself and will thus form a third support for the engine and will hold it horizontal after the counter-balancing force is removed from the handle 7 of the tool.

While I have shown this chain 22' in Fig. 1 in dotted lines connected to the rear part of the engine, it is evident from Fig. 1 that it cannot be put in this position until after the engine has been worked free of the automobile, as the dash 12 and the floor 13 of the automobile prevents this application of the chain.

As it is evident that many modifications of my invention will readily suggest themselves to one skilled in the art, I do not intend to limit my invention to the details of the specific form of tool herein described and illustrated, except within the limits of the appended claims.

I claim:

1. The herein described lifting tool comprising a lever having an end bent off substantially at right angles to the body of the lever and adapted to be projected through an automobile engine between the cylinders thereof, the lever formed with a downwardly curved heel adapted, in use to bear upon the forward end of the engine, said bent off end adapted to receive the lower ends of chains adapted to rise to the hook of a suitable hoist, the free end of the lever when in use projecting forward from the front end of the engine a suitable distance, so that the rear end of the engine beyond the point between the cylinders can be readily counterbalanced by an operator.

2. In a tool of the kind described, a lever comprising a bar having one end bent off substantially at right angles to the body of the lever and adapted to be projected transversely through an automobile engine frame between the cylinders thereof, an offset portion adjacent to the bent off portion for passing the valves of the engine, a curved heel at the junction of the offset portion and the body of the lever adapted to bear centrally upon the forward end of the engine, the body of the lever projecting forwardly and upwardly, the bent off end being curved to receive and retain the rings of a hoist chain, one on each side of the engine, the chain being adapted to rise to a suitable hoist.

3. The herein described lifting tool comprising a lever having one end bent off substantially at right angles to the body of the lever and adapted to be projected through a transverse opening in an automobile engine frame between the cylinders thereof, the lever formed into a downwardly extending heel between the bent off end and the body adapted in use to bear upon the forward end of the engine, said bent off end adapted to receive and retain the lower ends of chains adapted to rise to the hook of a suitable hoist, the free end of the lever when in use projecting forward from the front end of the engine in position for the application of a downward pressure to counterbalance the rear part of the engine when same is supported by said chains, and a third chain depending from the upper ends of said chains and adapted to be secured to the rear end of the engine after the engine has been lifted clear of the automobile to hold the engine in level condition.

4. In a tool for lifting an engine from its bed comprising, a bar adapted to engage the engine so as to have downwardly and upwardly bearing portions and a handle for applying a force to said bearing portions, said handle protruding from one side of the engine so that a force exerted on the handle will pivot one end of the engine to incline the same, and lifting means for bodily swinging the engine from its bed when the engine is inclined, said tool being provided with portions to permit attachment of said lifting means at each side of the engine.

5. In a tool for lifting an engine from its bed comprising, a bar of elbow formation having a laterally extending end portion, the point of said elbow engaging the engine so as to apply a downward force thereto, said lateral end portion engaging the engine so as to apply a lifting force to one end of the engine to permit horizontal movement of the same, and a hoist engaging said lateral end portion to bodily lift said engine from its bed.

6. A lever for controlling the lifting of an automobile engine, one end thereof formed for projecting through the engine frame between the cylinders thereof and to engage the frame in an upward direction, the lever having a part between its ends formed to bear downwardly upon the forward end of the engine, an offset portion between said two parts for permitting the downward bearing part to be centered transversely on the engine, and a projecting handle on the lever for operating same.

In witness whereof I hereunto subscribe my name this 22nd day of May, 1919.

CLARENCE C. CHASE.